US009260621B2

(12) United States Patent
Nagano et al.

(10) Patent No.: US 9,260,621 B2
(45) Date of Patent: Feb. 16, 2016

(54) WATER-BASED INK FOR INK-JET RECORDING, INK CARTRIDGE, INK-JET RECORDING APPARATUS, AND INK-JET RECORDING METHOD

(71) Applicants: Taro Nagano, Nagoya (JP); Hideji Fukaya, Nagoya (JP)

(72) Inventors: Taro Nagano, Nagoya (JP); Hideji Fukaya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 79 days.

(21) Appl. No.: 14/190,434

(22) Filed: Feb. 26, 2014

(65) Prior Publication Data

US 2014/0292895 A1 Oct. 2, 2014

(30) Foreign Application Priority Data

Mar. 28, 2013 (JP) ................................ 2013-068041

(51) Int. Cl.

*C09D 11/30* (2014.01)
*C09D 11/38* (2014.01)
*C09D 11/326* (2014.01)
*C09D 11/322* (2014.01)

(52) U.S. Cl.

CPC .............. *C09D 11/38* (2013.01); *C09D 11/322* (2013.01); *C09D 11/326* (2013.01)

(58) Field of Classification Search

CPC .... C09D 11/30; C09D 11/322; C09D 11/326; C09D 11/38
USPC .................................. 106/31.6, 31.85–31.89
See application file for complete search history.

(56) References Cited

U.S. PATENT DOCUMENTS

| | | | | |
|---|---|---|---|---|
| 6,436,178 | B1 * | 8/2002 | Hosmer | 106/31.46 |
| 8,016,404 | B2 | 9/2011 | Kato et al. | |
| 8,371,687 | B2 | 2/2013 | Tojo et al. | |
| 2006/0197814 | A1 | 9/2006 | Doi | |
| 2008/0241398 | A1 | 10/2008 | Kato et al. | |
| 2010/0165020 | A1 | 7/2010 | Tojo et al. | |

FOREIGN PATENT DOCUMENTS

| | | | |
|---|---|---|---|
| JP | 2004-035716 | A | 2/2004 |
| JP | 2006-241279 | A | 9/2006 |
| JP | 2008-246821 | A | 10/2008 |
| JP | 2010-155928 | A | 7/2010 |

* cited by examiner

*Primary Examiner* — Bruce H Hess
(74) *Attorney, Agent, or Firm* — Banner & Witcoff, Ltd.

(57) ABSTRACT

A water-based ink for ink-jet recording includes a self-dispersible pigment modified with carboxylic acid group; water; di-2-ethylhexyl sulfosuccinic acid or salt thereof; and a compound represented by the following general formula (1):

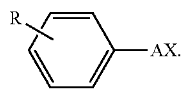

(1)

18 Claims, 1 Drawing Sheet

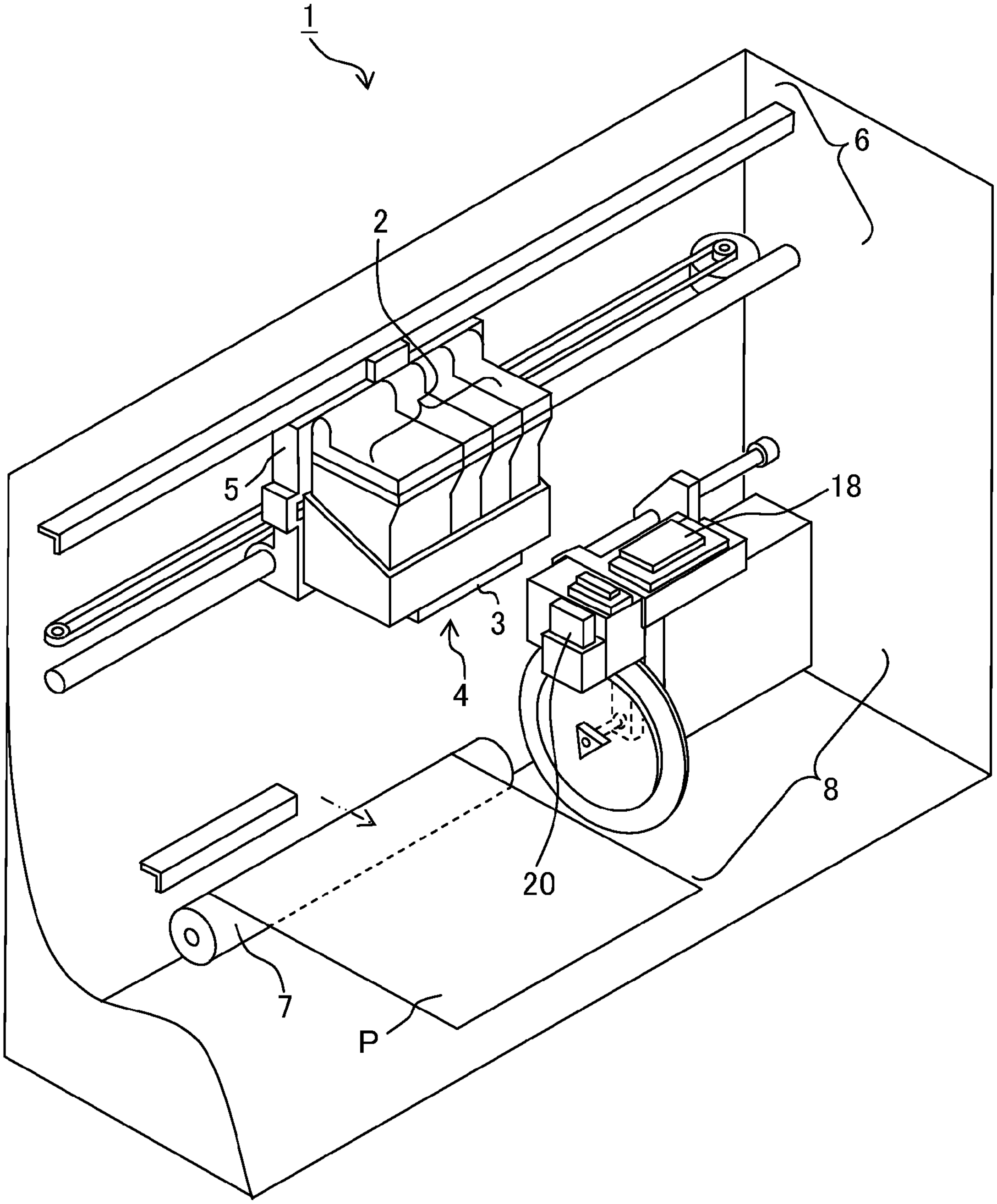
1
6
2
5
18
3
4
8
20
7
P

WATER-BASED INK FOR INK-JET RECORDING, INK CARTRIDGE, INK-JET RECORDING APPARATUS, AND INK-JET RECORDING METHOD

CROSS REFERENCE TO RELATED APPLICATION

The present application claims priority from Japanese Patent Application No. 2013-068041, filed on Mar. 28, 2013, the disclosure of which is incorporated herein by reference in its entirety.

BACKGROUND OF THE INVENTION

1. Field of the Invention

The present invention relates to a water-based ink for ink-jet recording, an ink cartridge, an ink-jet recording apparatus, and an ink-jet recording method.

2. Description of the Related Art

It is required for a water-based ink for ink-jet recording to provide the high optical density (OD value) and the quick drying performance adaptable to the high speed recording. As those capable of realizing these properties, a water-based ink for ink-jet recording has been suggested, in which, for example, the blending amount of a self-dispersing pigment is adjusted (Japanese Patent Application Laid-open No. 2004-35716).

However, if the blending amount of the self-dispersible pigment is increased in order to improve the optical density (OD value), the redispersibility of the water-based ink for ink-jet recording is lowered. On the other hand, if the discharge amount of the water-based ink for ink-jet recording is decreased in order to obtain the quick drying performance adaptable to the high speed recording, then the white stripe-shaped unevenness (banding) appears on a recorded image, and the optical density (OD value) is consequently lowered in some cases.

SUMMARY OF THE INVENTION

In view of the above, an object of the present teaching is to provide a water-based ink for ink-jet recording which does not lower the redispersibility even when the blending amount of the self-dispersible pigment is increased and which makes it possible to obtain a recorded image having a high optical density (OD value) by suppressing the white stripe-shaped unevenness (banding) even when the discharge amount of the water-based ink for ink-jet recording is decreased.

According to a first aspect of the present teaching, there is provided a water-based ink for ink-jet recording, including a self-dispersible pigment modified with carboxylic acid group; water; di-2-ethylhexyl sulfosuccinic acid or salt thereof; and a compound represented by the following general formula (1):

(1)

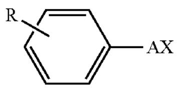

wherein in the general formula (1);

R represents a hydrogen atom, or a substituted or unsubstituted alkyl group which is a straight chain alkyl group or a branched chain alkyl group;

A represents an anion group; and

X represents $H^+$ or alkali metal ion.

According to a second aspect of the present teaching there is provided an ink cartridge including the water-based ink for ink-jet recording as defined in the first aspect.

According to a third aspect of the present teaching, there is provided an ink-jet recording apparatus including the water-based ink for ink-jet recording as defined in the first aspect; an ink accommodating unit which accommodates therein the water-based ink; and ink discharge mechanism which discharges the water-based ink accommodated in the ink accommodating unit.

According to a fourth aspect of the present teaching, there is provided an ink-jet recording method including preparing a recording medium; and discharging the water-based ink as defined in the first aspect onto the recording medium in accordance with an ink-jet system.

BRIEF DESCRIPTION OF THE DRAWINGS

FIG. 1 shows a schematic perspective view illustrating an exemplary construction of an ink-jet recording apparatus according to the present teaching.

DESCRIPTION OF THE PREFERRED EMBODIMENTS

In the present teaching, the term "redispersibility" of the water-based ink for ink-jet recording (hereinafter referred to as "water-based ink" or "ink" in some cases) means the solubility and the redispersibility of solid matter brought about, for example, when the water-based ink is once evaporated and dried up to produce the solid matter and then the solid matter is newly brought in contact with the water-based ink. The redispersibility of the water-based ink can be evaluated, for example, by means of a method described in Examples described later on.

In the present teaching, the discharge amount of the water-based ink, which is capable of obtaining the quick drying performance adaptable to the high speed recording, is exemplified, for example, by 28 pL to 32 pL for 600 dpi×300 dpi. However, the discharge amount may be various amounts depending on, for example, the resolution and the composition of the water-based ink, which is not limited to and restricted by the example described above.

The water-based ink of the present teaching will be explained. The water-based ink of the present teaching contains the coloring agent (colorant) and water.

The coloring agent includes the substance indicated as (a) shown below.

(a): self-dispersible pigment modified with carboxylic acid group (hereinafter referred to as "carboxylic acid group-modified self-dispersible pigment").

It is also allowable to use, for example, a commercially available product as the carboxylic acid group-modified self-dispersible pigment. The commercially available product is exemplified, for example, by "CAB-O-JET (trade name) 300" produced by Cabot Specialty Chemicals Inc. It is also allowable that the water-based ink contains any high molecular weight pigment dispersing agent (dispersant), or it is also allowable that the water-based ink does not contain any high molecular weight pigment dispersing agent. When the water-based ink contains the high molecular weight pigment dispersing agent, it is preferable that the amount is in such an extent that the viscosity of the water-based ink is not affected thereby. In this way, the water-based ink of the present teaching uses the carboxylic acid group-modified self-dispersible pigment. Therefore, the problem of the increase in viscosity, which results from the high molecular weight pigment dispersing agent, disappears. Further, the discharge stability and the storage stability are excellent.

The redispersibility of the water-based ink for ink-jet recording likely to be lowered when the self-dispersible pigment modified with the carboxylic acid group is used as the colorant. Therefore, the present teaching is effective for a water-based ink which substantially includes only the self-dispersible pigment modified with the carboxylic acid group as the colorant.

The solid content blending amount (pigment solid content amount) of the carboxylic acid group-modified self-dispersible pigment with respect to the total amount of the water-based ink is not specifically limited, which can be appropriately determined in accordance with, for example, the desired optical density or the coloration (colorfulness). The pigment solid content amount is, for example, 0.1% by weight to 20% by weight, preferably 1% by weight to 15% by weight, and more preferably 2% by weight to 10% by weight.

The coloring agent may further contain, for example, any other pigment and dye, in addition to the carboxylic acid group-modified self-dispersible pigment. It is also allowable that the water-based ink does not contain any coloring agent other than the pigment. The phenomenon, in which the white stripe-shaped unevenness (banding) appears on the recorded image as described above, tends to arise when the pigment is used as the coloring agent. Therefore, the present teaching is effective on the water-based ink which substantially contains only the pigment as the coloring agent, for example, the water-based ink in which 90% by weight to 100% by weight of the coloring agent is the pigment. Further, the phenomenon, in which the white stripe-shaped unevenness (banding) appears on the recorded image as described above, tends to arise when the carboxylic acid group-modified self-dispersible pigment is used as the coloring agent. Therefore, the present teaching is especially effective on the water-based ink which substantially contains only the carboxylic acid group-modified self-dispersible pigment as the coloring agent.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

The water-based ink for ink-jet recording of the present teaching contains the substance indicated as (b) shown below and the substance indicated as (c) shown below.

(b): di-2-ethylhexyl sulfosuccinic acid or salt thereof;

(c): compound represented by the general formula (1):

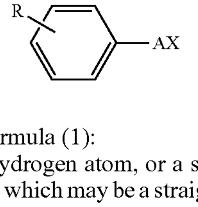

(1)

In the general formula (1):

R represents a hydrogen atom, or a substituted or unsubstituted alkyl group which may be a straight chain alkyl group or a branched chain alkyl group;

A represents an anion group; and X represents $H^+$ or alkali metal ion.

A commercially available product may be used as the substance indicated as (b) described above. The commercially available product is exemplified, for example, by “LIPAL” (trade name) 835I”, “LIPAL” (trade name) 860K”, and “LIPAL” (trade name) 870P” produced by Lion Corporation. The water-based ink, which is blended with the substance indicated as (b) described above, is excellent in the permeability. Therefore, when the water-based ink blended with the substance indicated as (b) described above is used, it is possible to obtain the recorded image in which the optical density (OD value) is high and the white stripe-shaped unevenness (banding) is suppressed as well. The salt of the substance indicated as (b) described above is not specifically limited, for which it is possible to exemplify, for example, sodium salt. The substance indicated as (b) described above may be in a state of ion in which the counterion of salt is ionized in the water-based ink. The blending amount of the substance indicated as (b) described above with respect to the total amount of the water-based ink is, for example, 0.1% by weight to 5% by weight, preferably 0.2% by weight to 4% by weight, and more preferably 0.3% by weight to 3% by weight. The blending amount of the substance indicated as (b) described above includes the blending amount of single acid (or ion provided by ionizing counterion) provided when salt is not included, the blending amount of single salt provided when acid (or ion provided by ionizing counterion) is not included, and the total blending amount of acid (or ion provided by ionizing counterion) and salt provided when both of acid (or ion provided by ionizing counterion) and salt are included.

As for the water-based ink, it is preferable that the ratio (b/a) of the substance indicated as (b) described above to the substance indicated as (a) described above is 0.09/1 to 0.35/1 in weight ratio. When b/a is within the range as described above, it is possible to obtain the recorded image in which the optical density (OD value) is higher and the white stripe-shaped unevenness (banding) is more suppressed.

Next, the substance indicated as (c) described above (compound represented by the general formula (1)) will be explained. As described above, in the general formula (1), R represents a hydrogen atom, or a substituted or unsubstituted alkyl group provided that the alkyl group may have either a straight chain or a branched chain. The alkyl group is exemplified, for example, by methyl group, ethyl group, n-propyl group, isopropyl group, n-butyl group, isobutyl group, sec-butyl group, tert-butyl group, n-pentyl group, n-hexyl group, n-heptyl group, n-octyl group, n-nonyl group, n-decyl group, n-undecyl group, and n-dodecyl group. The substituent of the substituted alkyl group is exemplified, for example, by hydroxyl group; alkoxy group such as methoxy group, ethoxy group and the like; cyano group; halogen atom such as fluorine atom, chlorine atom, bromine atom, iodine atom and the like; and ionic hydrophilic group such as carboxylic acid salt, sulfuric acid salt and the like. In the general formula (1), it is preferable that R is straight chain alkyl group having a number of carbon atoms of 8 to 12, i.e., n-octyl group, n-nonyl group, n-decyl group, n-undecyl group, and n-dodecyl group. In the general formula (1), R may be positioned at any one of ortho position, para position, and meta position.

As described above, in the general formula (1), A represents the anion group. The anion group is exemplified, for example, by sulfonic acid anion group ($—SO_3^-$) and carboxylic acid anion group ($—COO^-$). Taking the redispersibility into consideration, it is preferable that the anion group is sulfonic acid anion group ($—SO_3^-$).

As described above, in the general formula (1), X represents $H^+$ or alkali metal ion ($Li^+$, $Na^+$, $K^+$, $Rb^+$, $Cs^+$, or $Fr^+$).

For example, a commercially available product may be used for the substance indicated as (c) described above. The commercially available product is exemplified, for example, by sodium benzenesulfonate produced by Tokyo Kasei Kogyo Co., Ltd., sodium benzoate, p-toluenesulfonic acid, octylbenzenesulfonic acid, and "NEOPELEX (trade name) G-15" (sodium dodecylbenzenesulfonate) produced by Kao Corporation.

When the substance indicated as (c) described above is used in combination with the substance indicated as (a) described above, it is possible to obtain the water-based ink which is excellent in the redispersibility. The mechanism for improving the redispersibility is speculated, for example, as follows. That is, π electrons exist respectively in the benzene ring of the substance indicated as (c) described above (compound represented by the general formula (1)) and carbon black of the substance indicated as (a) described above (carboxylic acid group-modified self-dispersible pigment). In accordance with the interaction of the π electrons, the substance indicated as (c) described above exists in the vicinity of the substance indicated as (a) described above. Further, the coagulation (aggregation) of the substance indicated as (a) described above is suppressed, and the redispersibility is improved, in accordance with the electrostatic repulsive action of the anion group as A and the steric hindrance action of R in the substance indicated as (c) described above (compound represented by the general formula (1)). However, this mechanism resides in the speculation, which does not limit the present teaching.

The blending amount of the substance indicated as (c) described above with respect to the total amount of the water-based ink described above is, for example, 0.01% by weight to 5% by weight, preferably 0.02% by weight to 3% by weight, and more preferably 0.04% by weight to 2% by weight.

As for the water-based ink described above, it is preferable the ratio (c/b) of the substance indicated as (c) described above to the substance indicated as (b) described above is 0.07/1 to 0.5/1 in weight ratio. When c/b is within the range as described above, it is possible to obtain the water-based ink which is more excellent in the redispersibility.

The water-based ink described above may further contain a moistening agent (humectant) for preventing the water-based ink from being dried at the nozzle forward end portion of the ink-jet head and a permeating agent (penetrant) for adjusting the drying speed on the recording medium.

The moistening agent described above is not specifically limited. The moistening agent is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycols; polyhydric alcohols such as alkylene glycols, glycerol, and trimethylolpropane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One type of the moistening agent as described above may be used singly, or two or more types of the moistening agents as described above may be used in combination. Among them, it is preferable to use polyhydric alcohol such as alkylene glycol and glycerol.

The blending amount of the moistening agent with respect to the total amount of the water-based ink is, for example, 0% by weight to 95% by weight, preferably 5% by weight to 80% by weight, and more preferably 5% by weight to 50% by weight.

The permeating agent is exemplified, for example, by glycol ether. The glycol ether is exemplified, for example, by ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, dipropylene glycol methyl ether, dipropylene glycol ethyl ether, dipropylene glycol n-propyl ether, tripropylene glycol methyl ether, and tripropylene glycol ethyl ether. One type of the permeating agent as described above may be used singly, or two or more types of the permeating agents as described above may be used in combination.

The blending amount of the permeating agent with respect to the total amount of the water-based ink is, for example, 0% by weight to 20% by weight, preferably 0.1% by weight to 15% by weight, and more preferably 0.5% by weight to 10% by weight.

The water-based ink may further contain conventionally known additives, if necessary. The additive includes, for example, surfactants other than the substance indicated as (b) described above and the substance indicated as (c) described above, pH-adjusting agents, viscosity-adjusting agents, surface tension-adjusting agents, and fungicides. The viscosity-adjusting agent includes, for example, polyvinyl alcohol, cellulose, and water-soluble resin.

The water-based ink described above can be prepared, for example, such that the substance indicated as (a), water, the substance indicated as (b), the substance indicated as (c), and optionally other additive components are mixed uniformly or homogeneously in accordance with any conventionally known method, and undissolved matters are removed by means of a filter or the like.

As described above, as for the water-based ink for ink-jet recording of the present teaching, the substance indicated as (b) described above and the substance indicated as (c) described above are used in combination. Therefore, even when the blending amount of the self-dispersible pigment (substance indicated as (a) described above) is increased, then it is possible to raise the optical density (OD value) without lowering the redispersibility, and it is possible to obtain the recorded image in which the white stripe-shaped unevenness (banding) is suppressed as well.

In the next place, the ink cartridge of the present teaching resides in an ink cartridge including a water-based ink for ink-jet recording, wherein the water-based ink is the water-based ink for ink-jet recording of the present teaching. For example, those conventionally known can be used as a main body of the ink cartridge.

Next, the ink-jet recording apparatus and the ink-jet recording method of the present teaching will be explained.

The ink-jet recording apparatus of the present teaching resides in an ink-jet recording apparatus including an ink accommodating unit and an ink discharge mechanism, for discharging an ink accommodated in the ink accommodating unit by the ink discharge mechanism, wherein the water-based ink for ink-jet recording of the present teaching is accommodated in the ink accommodating unit.

The ink-jet recording method of the present teaching resides in an ink-jet recording method for performing recording by discharging a water-based ink onto a recording medium in accordance with an ink-jet system, wherein the water-based ink for ink-jet recording of the present teaching is used as the water-based ink.

The ink-jet recording method of the present teaching can be carried out, for example, by using the ink-jet recording apparatus of the present teaching. The recording includes, for example, the letter (character) printing, the image printing, and the printing (print or presswork).

FIG. 1 shows an exemplary construction of the ink-jet recording apparatus of the present teaching. As shown in FIG. 1, the ink-jet recording apparatus 1 includes, as main constitutive components, four ink cartridges 2, an ink discharge mechanism (ink-jet head) 3, a head unit 4, a carriage 5, a driving unit 6, a platen roller 7, and a purge unit 8.

Each of the four ink cartridges 2 contains one color of each of four colors of water-based inks of yellow, magenta, cyan, and black. For example, the water-based black ink is the water-based ink for ink-jet recording of the present teaching. Generally available water-based inks may be used for the other water-based inks. The ink-jet head 3, which is installed for the head unit 4, performs the recording on the recording medium (for example, recording paper) P. The four ink cartridges 2 and the head unit 4 are carried on the carriage 5. The driving unit 6 reciprocatively moves the carriage 5 in the straight line direction. For example, those conventionally known can be used as the driving unit 6 (see, for example, Japanese Patent Application Laid-open No. 2008-246821 corresponding to United States Patent Application Publication No. 2008/0241398). The platen roller 7 extends in the reciprocating direction of the carriage 5, and the platen roller 7 is arranged opposingly to the ink-jet head 3.

The purge apparatus 8 sucks any defective ink containing, for example, bubbles accumulated in the ink-jet head 3. For example, those conventionally known can be used as the purge apparatus 8 (see, for example, Japanese Patent Application Laid-open No. 2008-246821).

A wiper member 20 is arranged adjacently to the purge apparatus 8 on the platen roller 7 side of the purge apparatus 8. The wiper member 20 is formed to have a spatula-shaped form. The wiper member 20 wipes out the nozzle-formed surface of the ink-jet head 3 in accordance with the movement of the carriage 5. With reference to FIG. 1, a cap 18 covers a plurality of nozzles of the ink-jet head 3 which is to be returned to the reset position when the recording is completed, in order to prevent the water-based inks from being dried.

In the ink-jet recording apparatus 1 of this embodiment, the four ink cartridges 2 are carried on one carriage 5 together with the head unit 4. However, the present teaching is not limited thereto. In the ink-jet recording apparatus described above, each of the cartridges of the four ink cartridges 2 may be carried on any carriage distinct from the head unit 4. Alternatively, it is also allowable that the respective cartridges of the four ink cartridges 2 are not carried on the carriage 5, and they are arranged and fixed in the ink-jet recording apparatus. In the embodiments as described above, for example, the respective cartridges of the four ink cartridges 2 are connected to the head unit 4 carried on the carriage 5, for example, by means of tubes or the like, and the water-based inks are supplied from the respective cartridges of the four ink cartridges 2 to the head unit 4.

The ink-jet recording, which is based on the use of the ink-jet recording apparatus 1, is carried out, for example, as follows. At first, the recording paper P is fed from a paper feed cassette (not shown) provided at a side portion or a lower portion of the ink-jet recording apparatus 1. The recording paper P is introduced into the space between the ink-jet head 3 and the platen roller 7. The predetermined recording is performed on the introduced recording paper P by means of the water-based inks discharged from the ink-jet head 3. The water-based ink of the present teaching is excellent in the redispersibility as well. Therefore, it is possible to perform the stable discharge from the ink-jet head 3. Further, according to the water-based ink of the present teaching, it is possible to obtain the recorded image in which the optical density (OD value) is high and the white stripe-shaped unevenness (banding) is suppressed. The recording paper P after the recording is discharged from the ink-jet recording apparatus 1. A paper feed mechanism and a paper discharge mechanism for the recording paper P are omitted from the illustration in FIG. 1.

The apparatus shown in FIG. 1 adopts the serial type ink-jet head. However, the present teaching is not limited thereto. The ink-jet recording apparatus may be an apparatus which adopts a line type ink-jet head.

EXAMPLES

Next, Examples of the present teaching will be explained together with Comparative Examples. The present teaching is not limited to and restricted by Examples and Comparative Examples described below.

Example 1 and Comparative Example 1

Ink solvents were obtained by uniformly mixing components except for self-dispersible carbon black contained in water-based ink compositions (Table 1 and Table 2). Subsequently, the ink solvents were added to self-dispersible carbon black dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based inks for ink-jet recording of Examples 1-1 to 1-16 and Comparative Examples 1-1 to 1-11 were obtained.

Example 2 and Comparative Example 2

Ink solvents were obtained by uniformly mixing components except for self-dispersible carbon black contained in water-based ink compositions (Table 3). Subsequently, the ink solvents were added to self-dispersible carbon black dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based inks for ink-jet recording of Examples 2-1 to 2-2 and Comparative Examples 2-1 to 2-3 were obtained.

In relation to the water-based inks of Examples and Comparative Examples, (a) the evaluation of the redispersibility, (b) the evaluation of the white stripe-shaped unevenness (banding), (c) and the measurement of the optical density (OD value) were carried out in accordance with the following methods.

(a) Evaluation of Redispersibility

12 μL of each of the water-based inks of Examples and Comparative Examples was added dropwise onto a slide glass. Subsequently, the slide glass was stored for 1 day in an environment of a temperature of 60° C. and a relative humidity of 40%, and thus the water-based inks were evaporated and dried up. Subsequently, 1 mL of pure water was added dropwise onto the solid matter after the storage. The evaluation sample prepared as described above was observed visually and microscopically (magnification: ×200), and the redispersibility was evaluated in accordance with the following evaluation criteria.

<Evaluation Criteria for Evaluation of Redispersibility>

AA: Coarse particles and foreign matters were not observed even by the microscopic observation.

A: No abnormality was found in the visual observation, but coarse particles in an extremely small amount, which were at such a level that no problem arose practically, were observed by the microscopic observation.

B: Redispersion (dissolution and dispersion in pure water) occurred, but any remaining undissolved matter was confirmed by the visual observation.

C: Redispersion did not occur at all.

(b) Evaluation of White Stripe-Shaped Unevenness (Banding)

An evaluation patch of 3 inches×3 inches (7.62 cm×7.62 cm) was recorded by discharging each of the water-based inks of Examples and Comparative Examples under the condition of 600×300 dpi, the ink droplet amount of 30 pL, and 100% duty (solid image) by using a digital multifunction machine DCP-J525N carried with an ink-jet printer produced by Brother Industries, Ltd. The evaluation patch prepared as described above was visually observed, and the white stripe-shaped unevenness (banding) was evaluated in accordance with the following evaluation criteria.

<Evaluation Criteria for Evaluation of White Stripe-Shaped Unevenness (Banding)>

G: No white stripe-shaped unevenness (banding) was confirmed on the evaluation patch.

NG: Any white stripe-shaped unevenness (banding) was confirmed on the evaluation patch.

(c) Measurement of Optical Density (OD Value)

Optical densities (OD values) were measured at five positions in the evaluation patch prepared in the same manner as that provided in "(b) evaluation of white stripe-shaped unevenness (banding)" described above by using a spectrophotometer (spectrophotometric colorimetry meter) SpectroEye produced by X-Rite (light source: $D_{50}$, field: 2°, density reference: ANSIT), and an average value was determined. Hammer Mill Laser Print 241b (regular paper 1) produced by International Paper and 4200 (regular paper 2) produced by Xerox were used to prepare the evaluation patch.

Table 1 shows the water-based ink compositions and the measurement and evaluation results of the water-based inks of Example 1. Table 2 shows the water-based ink compositions and the measurement and evaluation results of the water-based inks of Comparative Example 1. Further, Table 3 shows the water-based ink compositions and the measurement and evaluation results of the water-based inks of Example 2 and Comparative Example 2.

<Note that in Tables 1, 2 and 3>

*1: Self-dispersible carbon black modified with carboxylic acid group, produced by Cabot Specialty Chemicals Inc., carbon black concentration=15% by weight, numerical value in parentheses indicates pigment solid content amount.

*2: Sodium di-2-ethylhexyl sulfosuccinate, produced by Lion Corporation, active ingredient: 68% by weight, numerical value in parentheses indicates active ingredient amount.

*3: Produced by Tokyo Kasei Kogyo Co., Ltd.

*4: Produced by Tokyo Kasei Kogyo Co., Ltd.

*5: Produced by Tokyo Kasei Kogyo Co., Ltd.

*6: Produced by Tokyo Kasei Kogyo Co., Ltd.

*7: Sodium dodecylbenzenesulfonate, produced by Kao Corporation, active ingredient: 16% by weight, numerical value in parentheses indicates active ingredient amount.

*8: Disodium lauryl sulfosuccinate, produced by Sanyo Chemical Industries, Ltd., active ingredient: 49% by weight, numerical value in parentheses indicates active ingredient amount.

*9: Sodium polyoxyethylene alkyl (C=12, 13) ether sulfate (3E.O.), produced by Lion Corporation, active ingredient: 28% by weight, numerical value in parentheses indicates active ingredient amount.

*10: Ethylene oxide (10 mole) adduct of acetylene diol, produced by Nissin Chemical Industry Co., Ltd.

*11: Hammer Mill Laser Print 241b, produced by International Paper.

*12: 4200, produced by Xerox.

TABLE 1

| | | | Example | | | | | | | |
|---|---|---|---|---|---|---|---|---|---|---|
| | | | 1-1 | 1-2 | 1-3 | 1-4 | 1-5 | 1-6 | 1-7 | 1-8 |
| Water-based ink composition (% by weight) | (a) | CAB-O-JET (trade name) 300 (*1) | 26.67 (4.00) | 26.67 (4.00) | 26.67 (4.00) | 26.67 (4.00) | 26.67 (4.00) | 26.67 (4.00) | 26.67 (4.00) | 26.67 (4.00) |
| | (b) | LIPAL (trade name) 870P (*2) | 1.00 (0.68) | 1.00 (0.68) | 1.00 (0.68) | 1.00 (0.68) | 1.00 (0.68) | 1.00 (0.68) | 1.00 (0.68) | 1.25 (0.85) |
| | (c) | Sodium benzenesulfonate (*3) | 0.16 | 0.16 | 0.16 | — | — | — | — | — |
| | | Sodium benzoate (*4) | — | — | — | 0.16 | 0.16 | 0.16 | — | — |
| | | p-Toluenesulfonic acid (*5) | — | — | — | — | — | — | 0.16 | 0.30 |
| | | Octylbenzenesulfonic acid (*6) | — | — | — | — | — | — | — | — |
| | | NEOPELEX (trade name) G-15 (*7) | — | — | — | — | — | — | — | — |
| | SUNNOL (trade name) NL1430 (*9) | | — | 1.90 | — | — | — | — | — | — |
| | OLFINE (trade name) E1010 (*10) | | — | — | 0.50 | — | — | — | — | — |
| | Glycerol | | 25.00 | 25.00 | 25.00 | 25.00 | 25.00 | 25.00 | 25.00 | 25.00 |
| | Dipropylene glycol n-propyl ether | | 1.00 | 1.00 | 1.00 | 1.00 | 1.00 | 1.00 | 1.00 | 1.00 |
| | Water | | balance | balance | balance | balance | balance | balance | balance | balance |
| b/a | | | 0.17 | 0.17 | 0.17 | 0.17 | 0.17 | 0.17 | 0.17 | 0.21 |
| c/b | | | 0.24 | 0.24 | 0.24 | 0.24 | 0.24 | 0.24 | 0.24 | 0.35 |
| Redispersibility | | | A | A | A | A | A | A | A | A |
| White stripe-shaped unevennees (banding) | | | G | G | G | G | G | G | G | G |
| Optical density (OD value) | | | | | | | | | | |
| Regular paper 1 (*11) | | | 1.04 | 1.04 | 1.04 | 1.04 | 1.04 | 1.04 | 1.04 | 1.05 |
| Regular paper 2 (*12) | | | 1.04 | 1.04 | 1.02 | 1.03 | 1.05 | 1.03 | 1.03 | 1.05 |

TABLE 1-continued

| | | | Example | | | | | | | |
|---|---|---|---|---|---|---|---|---|---|---|
| | | | 1-9 | 1-10 | 1-11 | 1-12 | 1-13 | 1-14 | 1-15 | 1-16 |
| Water-based ink composition (% by weight) | (a) | CAB-O-JET (trade name) 300 (*1) | 26.67 (4.00) | 26.67 (4.00) | 26.67 (4.00) | 26.67 (4.00) | 26.67 (4.00) | 26.67 (4.00) | 26.67 (4.00) | 26.67 (4.00) |
| | (b) | LIPAL (trade name) 870P (*2) | 1.00 (0.68) | 1.25 (0.85) | 1.47 (1.00) | 1.00 (0.68) | 1.00 (0.68) | 1.00 (0.68) | 0.50 (0.34) | 2.00 (1.36) |
| | (c) | Sodium benzenesulfonate (*3) | — | — | — | — | — | — | — | — |
| | | Sodium benzoate (*4) | — | — | — | — | — | — | — | — |
| | | p-Toluenesulfonic acid (*5) | — | — | — | — | — | — | — | — |
| | | Octylbenzenesulfonic acid (*6) | 0.16 | 0.30 | — | — | — | — | — | — |
| | | NEOPELEX (trade name) G-15 (*7) | — | — | 1.00 (0.16) | 1.00 (0.16) | 0.50 (0.08) | 0.30 (0.05) | 1.00 (0.16) | 1.50 (0.24) |
| | SUNNOL (trade name) NL1430 (*9) | | — | — | — | — | — | — | — | — |
| | OLFINE (trade name) E1010 (*10) | | — | — | — | — | — | — | — | — |
| | Glycerol | | 25.00 | 25.00 | 25.00 | 25.00 | 25.00 | 25.00 | 25.00 | 25.00 |
| | Dipropylene glycol n-propyl ether | | 1.00 | 1.00 | 1.00 | 1.00 | 1.00 | 1.00 | 1.00 | 1.00 |
| | Water | | balance | balance | balance | balance | balance | balance | balance | balance |
| b/a | | | 0.17 | 0.21 | 0.25 | 0.17 | 0.17 | 0.17 | 0.09 | 0.34 |
| c/b | | | 0.24 | 0.35 | 0.16 | 0.24 | 0.12 | 0.07 | 0.47 | 0.18 |
| Redispersibility | | | AA | AA | AA | AA | AA | AA | AA | AA |
| White stripe-shaped unevenness (banding) | | | G | G | G | G | G | G | G | G |
| Optical density (OD value) | | | | | | | | | | |
| Regular paper 1 (*11) | | | 1.04 | 1.04 | 1.05 | 1.04 | 1.03 | 1.03 | 1.02 | 1.06 |
| Regular paper 2 (*12) | | | 1.04 | 1.03 | 1.06 | 1.03 | 1.03 | 1.03 | 1.04 | 1.06 |

TABLE 2

| | | | Comparative Example | | | | | |
|---|---|---|---|---|---|---|---|---|
| | | | 1-1 | 1-2 | 1-3 | 1-4 | 1-5 | 1-6 |
| Water-based ink composition (% by weight) | (a) | CAB-O-JET (trade name) 300 (*1) | 26.67 (4.00) | 26.67 (4.00) | 26.67 (4.00) | 26.67 (4.00) | 26.67 (4.00) | 26.67 (4.00) |
| | (b) | LIPAL (trade name) 870P (*2) | — | 0.10 (0.07) | 0.25 (0.17) | 0.50 (0.34) | — | — |
| | (c) | Sodium benzenesulfonate (*3) | — | — | — | — | 0.16 | — |
| | | Sodium benzoate (*4) | — | — | — | — | — | 0.16 |
| | | p-Toluenesulfonic acid (*5) | — | — | — | — | — | — |
| | | Octylbenzenesulfonic acid (*6) | — | — | — | — | — | — |
| | | NEOPELEX (trade name) G-15 (*7) | 1.00 (0.16) | — | — | — | 1.00 (0.16) | 1.00 (0.16) |
| | BEAULIGHT (trade name) SSS (*8) | | — | — | — | — | — | — |
| | SUNNOL (trade name) NL1430 (*9) | | — | — | — | — | — | — |
| | OLFINE (trade name) E1010 (*10) | | — | — | — | — | — | — |
| | Glycerol | | 25.00 | 25.00 | 25.00 | 25.00 | 25.00 | 25.00 |
| | Dipropylene glycol n-propyl ether | | 1.00 | 1.00 | 1.00 | 1.00 | 1.00 | 1.00 |
| | Water | | balance | balance | balance | balance | balance | balance |
| b/a | | | 0.00 | 0.02 | 0.04 | 0.09 | 0.00 | 0.00 |
| c/b | | | — | 0.00 | 0.00 | 0.00 | — | — |
| Redispersibility | | | AA | AA | B | B | A | A |
| White stripe-shaped unevenness (banding) | | | NG | NG | NG | G | NG | NG |
| Optical density (OD value) | | | | | | | | |
| Regular paper 1 (*11) | | | 0.97 | 0.97 | 1.00 | 1.05 | 0.97 | 0.98 |
| Regular paper 2 (*12) | | | 0.98 | 0.99 | 0.98 | 1.05 | 0.97 | 0.97 |

| | | | Comparative Example | | | | |
|---|---|---|---|---|---|---|---|
| | | | 1-7 | 1-8 | 1-9 | 1-10 | 1-11 |
| Water-based ink composition (% by weight) | (a) | CAB-O-JET (trade name) 300 (*1) | 26.67 (4.00) | 26.67 (4.00) | 26.67 (4.00) | 26.67 (4.00) | 26.67 (4.00) |
| | (b) | LIPAL (trade name) 870P (*2) | — | — | — | — | — |
| | (c) | Sodium benzenesulfonate (*3) | — | — | — | — | — |
| | | Sodium benzoate (*4) | — | — | — | — | — |
| | | p-Toluenesulfonic acid (*5) | 0.16 | — | — | — | — |
| | | Octylbenzenesulfonic acid (*6) | — | 0.16 | — | — | — |
| | | NEOPELEX (trade name) G-15 (*7) | — | — | — | — | — |
| | BEAULIGHT (trade name) SSS (*8) | | — | — | 1.00 | — | — |
| | SUNNOL (trade name) NL1430 (*9) | | — | — | — | 1.90 | — |
| | OLFINE (trade name) E1010 (*10) | | — | — | — | — | 0.50 |
| | Glycerol | | 25.00 | 25.00 | 25.00 | 25.00 | 25.00 |
| | Dipropylene glycol n-propyl ether | | 1.00 | 1.00 | 1.00 | 1.00 | 1.00 |
| | Water | | balance | balance | balance | balance | balance |

TABLE 2-continued

| | | | | | |
|---|---|---|---|---|---|
| b/a | 0.00 | 0.00 | 0.00 | 0.00 | 0.00 |
| c/b | — | — | — | — | — |
| Redispersibility | A | A | A | A | A |
| White stripe-shaped unevenness (banding) | NG | NG | NG | NG | G |
| Optical density (OD value) | | | | | |
| Regular paper 1 (*11) | 0.97 | 0.96 | 0.96 | 0.99 | 0.98 |
| Regular paper 2 (*12) | 0.96 | 0.96 | 0.98 | 0.99 | 0.99 |

TABLE 3

| | | Example | | Comparative Example | | |
|---|---|---|---|---|---|---|
| | | 2-1 | 2-2 | 2-1 | 2-2 | 2-3 |
| Water-based ink composition (% by weight) | (a) CAB-O-JET (trade name) 300 (*1) | 46.69 (7.00) | 46.69 (7.00) | 46.69 (7.00) | 46.69 (7.00) | 46.69 (7.00) |
| | (b) LIPAL (trade name) 870P (*2) | 1.00 (0.68) | 3.50 (2.38) | — | 1.00 (0.68) | 3.50 (2.38) |
| | (c) NEOPELEX (trade name) G-15 (*7) | 0.25 (0.04) | 4.60 (0.74) | 4.60 (0.74) | — | — |
| | Glycerol | 25.00 | 25.00 | 25.00 | 25.00 | 25.00 |
| | Dipropylene glycol n-propyl ether | 1.00 | 1.00 | 1.00 | 1.00 | 1.00 |
| | Water | balance | balance | balance | balance | balance |
| b/a | | 0.10 | 0.34 | 0.00 | 0.10 | 0.34 |
| c/b | | 0.06 | 0.31 | — | 0.00 | 0.00 |
| Redispersibility | | AA | A | AA | C | C |
| White stripe-shaped unevenness (banding) | | G | G | NG | G | G |
| Optical density (OD value) | | | | | | |
| Regular paper 1 (*11) | | 1.06 | 1.10 | 1.02 | 1.05 | 1.06 |
| Regular paper 2 (*12) | | 1.09 | 1.10 | 1.06 | 1.08 | 1.11 |

As shown in Table 1, the pigment solid content amount was 4.00% by weight in Examples 1-1 to 1-16 in which the results of the evaluation of the redispersibility and the evaluation of the white stripe-shaped unevenness (banding) were excellent, and the optical density (OD value) was high as well. The compound, in which A in the general formula (1) was sulfonic acid anion group ($—SO_3^-$), was used as the substance indicated as (c) in Examples 1-1 to 1-3 and 1-7 to 1-16 in which the result of the evaluation of the redispersibility was excellent. In particular, the compound, in which A was sulfonic acid anion group ($—SO_3^-$) and R was the straight chain alkyl group having the number of carbon atoms of 8 to 12 in the general formula (1), was used in Examples 1-9 to 1-16 in which the result of the evaluation of the redispersibility was especially excellent.

On the other hand, as shown in Table 2, the pigment solid content amount was 4.00% by weight, the substance indicated as (c) was used, but the substance indicated as (b) was not used in Comparative Examples 1-1 and 1-5 to 1-8 in which the result of the evaluation of the redispersibility was excellent, but the result of the evaluation of the white stripe-shaped unevenness (banding) was unsatisfactory, and the optical density (OD value) was low as well. The pigment solid content amount was 4.00% by weight and disodium lauryl sulfosuccinate or sodium polyoxyethylene alkyl (C=12, 13) ether sulfate (3E.O.) was used in place of the substance indicated as (b) in Comparative Examples 1-9 and 1-10 in which the result of the evaluation of the white stripe-shaped unevenness (banding) was unsatisfactory, and the optical density (OD value) was low as well. The pigment solid content amount was 4.00% by weight and ethylene oxide (10 mole) adduct of acetylene diol was used in place of the substance indicated as (b) in Comparative Example 1-11 in which the optical density (OD value) was low.

The pigment solid content amount was 4.00% by weight, the substance indicated as (c) was not used, and the blending amount of the substance indicated as (b) was 0.07% by weight in Comparative Example 1-2 in which the result of the evaluation of the white stripe-shaped unevenness (banding) is unsatisfactory, and the optical density (OD value) was low as well. The pigment solid content amount was 4.00% by weight, the substance indicated as (c) was not used, and the blending amount of the substance indicated as (b) was 0.17% by weight in Comparative Example 1-3 in which the results of the evaluation of the redispersibility and the evaluation of the white stripe-shaped unevenness (banding) were unsatisfactory, and the optical density (OD value) was low as well. The pigment solid content amount was 4.00% by weight, the substance indicated as (c) was not used, and the blending amount of the substance indicated as (b) was 0.34% by weight in Comparative Example 1-4 in which the result of the evaluation of the redispersibility was unsatisfactory. When the Comparative Examples 1-2 to 1-4 are compared with each other, then the optical density (OD value) is improved and the result of the evaluation of the white stripe-shaped unevenness (banding) becomes satisfactory as well, as the blending amount of the substance indicated as (b) is more increased. However, on the contrary, the evaluation of the redispersibility becomes unsatisfactory, as the blending amount of the substance indicated as (b) is more increased.

As shown in Table 3, the pigment solid content amount was also 7.00% by weight in Examples 2-1 to 2-2 in which the results of the evaluation of the redispersibility and the evaluation of the white stripe-shaped unevenness (banding) were excellent, and the optical density (OD value) was high as well. On the other hand, the pigment solid content amount was 7.00% by weight and the substance indicated as (b) was not used in Comparative Example 2-1 in which the result of the evaluation of the white stripe-shaped unevenness (banding)

was unsatisfactory, and the optical density (OD value) was low as well. The pigment solid content amount was 7.00% by weight and the substance indicated as (c) was not used in Comparative Examples 2-2 and 2-3 in which the result of the evaluation of the redispersibility was unsatisfactory.

As described above, in the case of the water-based ink of the present teaching, even when the blending amount of the self-dispersible pigment is increased, then it is possible to raise the optical density (OD value) without lowering the redispersibility, and it is possible to obtain the recorded image in which the white stripe-shaped unevenness (banding) is suppressed as well. The way of use of the water-based ink of the present teaching is not specifically limited. The water-based ink of the present teaching is widely applicable to various types of ink-jet recording.

What is claimed is:

1. A water-based ink for ink-jet recording, comprising:

a self-dispersible pigment modified with carboxylic acid group;

water;

di-2-ethylhexyl sulfosuccinic acid or salt thereof; and a compound represented by the following general formula (1):

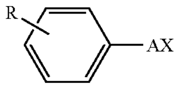

(1)

wherein in the general formula (1);

R represents a hydrogen atom, or a substituted or unsubstituted alkyl group which is a straight chain alkyl group or a branched chain alkyl group;

A represents an anion group; and

X represents $H^+$ or alkali metal ion.

2. The water-based ink for ink-jet recording according to claim 1, wherein A is sulfonic acid anion group in the general formula (1).

3. The water-based ink for ink-jet recording according to claim 1, wherein a weight ratio of the compound represented by the general formula (1) to the di-2-ethylhexyl sulfosuccinic acid or salt thereof is in a range of 0.07/1 to 0.5/1.

4. The water-based ink for ink-jet recording according to claim 1, wherein a weight ratio of the di-2-ethylhexyl sulfosuccinic acid or salt thereof to the self-dispersible pigment modified with carboxylic acid group is in a range of 0.09/1 to 0.35/1.

5. The water-based ink for ink-jet recording according to claim 1, wherein R is the straight chain alkyl group having 8 to 12 carbon atoms in the general formula (1).

6. The water-based ink for ink-jet recording according to claim 1, wherein the di-2-ethylhexyl sulfosuccinic acid or salt thereof is sodium di-2-ethylhexyl sulfosuccinate.

7. The water-based ink for ink-jet recording according to claim 1, wherein the compound represented by the general formula (1) is at least one selected from the group consisting of sodium benzenesulfonate, sodium benzoate, p-toluenesulfonic acid, octylbenzenesulfonic acid, and sodium dodecylbenzenesulfonate.

8. The water-based ink for ink-jet recording according to claim 1, wherein the compound represented by the general formula (1) is at least one of octylbenzenesulfonic acid and sodium dodecylbenzenesulfonate.

9. The water-based ink for ink-jet recording according to claim 1, wherein the compound represented by the general formula (1) is octylbenzenesulfonic acid.

10. The water-based ink for ink-jet recording according to claim 1, wherein the compound represented by the general formula (1) is sodium dodecylbenzenesulfonate.

11. The water-based ink for ink-jet recording according to claim 1, wherein the di-2-ethylhexyl sulfosuccinic acid or salt thereof is contained by 0.1% by weight to 5% by weight in the water-based ink.

12. The water-based ink for ink-jet recording according to claim 1, wherein the compound represented by the general formula (1) is contained by 0.01% by weight to 5% by weight in the water-based ink.

13. The water-based ink for ink-jet recording according to claim 1, wherein the self-dispersible pigment modified with carboxylic acid group is self-dispersible carbon black modified with carboxylic acid group.

14. The water-based ink for ink-jet recording according to claim 1, wherein only the self-dispersible pigment modified with carboxylic acid group is substantially contained as a colorant in the water-based ink.

15. An ink cartridge comprising the water-based ink for ink-jet recording as defined in claim 1.

16. An ink-jet recording apparatus comprising:

the water-based ink for ink-jet recording as defined in claim 1;

an ink accommodating unit which accommodates therein the water-based ink; and ink discharge mechanism which discharges the water-based ink accommodated in the ink accommodating unit.

17. An ink-jet recording method comprising:

preparing a recording medium; and discharging the water-based ink as defined in claim 1 onto the recording medium in accordance with an ink-jet system.

18. A water-based ink for ink-jet recording, comprising:

carbon black modified with carboxylic acid group;

water;

sodium di-2-ethylhexyl sulfosuccinate; and at least one of octylbenzenesulfonic acid and sodium dodecylbenzenesulfonate, wherein:

a weight ratio of octylbenzenesulfonic acid or sodium dodecylbenzenesulfonate to sodium di-2-ethylhexyl sulfosuccinate is in a range of 0.07/1 to 0.5/1; and a weight ratio of sodium di-2-ethylhexyl sulfosuccinate to the carbon black modified with carboxylic acid group is in a range of 0.09/1 to 0.35/1.

* * * * *